(12) United States Patent
Nakane

(10) Patent No.: US 9,357,231 B2
(45) Date of Patent: May 31, 2016

(54) VIDEO ENCODING DEVICE, VIDEO ENCODING METHOD, VIDEO REPRODUCING DEVICE, VIDEO REPRODUCING METHOD, VIDEO RECORDING MEDIUM, AND VIDEO DATA STREAM

(75) Inventor: Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 584 days.

(21) Appl. No.: 12/994,063

(22) PCT Filed: Jun. 10, 2009

(86) PCT No.: PCT/JP2009/002614
§ 371 (c)(1),
(2), (4) Date: Nov. 22, 2010

(87) PCT Pub. No.: WO2010/013382
PCT Pub. Date: Feb. 4, 2010

(65) Prior Publication Data
US 2011/0069153 A1  Mar. 24, 2011

(30) Foreign Application Priority Data
Jul. 31, 2008  (JP) .................................. 2008-198132

(51) Int. Cl.
*H04L 13/02*  (2006.01)
*H04L 13/00*  (2006.01)
(Continued)

(52) U.S. Cl.
CPC ........... *H04N 19/597* (2014.11); *H04N 13/004* (2013.01); *H04N 13/007* (2013.01); *H04N 13/0048* (2013.01); *H04N 13/0066* (2013.01); *H04N 19/70* (2014.11)

(58) Field of Classification Search
CPC ................. H04N 13/0055; H04N 19/00769; H04N 13/0239; H04N 13/0059; H04N 13/0048
USPC .............................................. 348/43; 386/124
IPC ........................................... H04N 13/00, 13/02
See application file for complete search history.

(56) References Cited

U.S. PATENT DOCUMENTS 5,619,256 A * 4/1997 Haskell et al. .................. 348/43
2003/0012425 A1 * 1/2003 Suzuki ............... G02B 27/0093
382/154

(Continued)

FOREIGN PATENT DOCUMENTS

CN  101180658 A  5/2008
JP  6-153239 A  5/1994

(Continued)

*Primary Examiner* — Allen Parker
*Assistant Examiner* — Long Le
(74) *Attorney, Agent, or Firm* — Birch, Stewart, Kolasch & Birch, LLP

(57) ABSTRACT

In a system for visualizing a stereoscopic image by displaying separate video images for the left and right eyes, sub-picture data (GRD) is created for the left eye and displayed superimposed on left-eye video data (VDD) as a left-eye sub-picture without change. The right-eye sub-picture (106) is displayed by shifting the horizontal positions at which the sub-picture data created for the left eye is displayed by prescribed widths. For example, the sub picture may include a plurality of objects (GRD-1, GRD-2, . . . , GRD-N); shift widths (108, 110) of the horizontal positions of the left and right ends of the objects are individually set and stored in the sub-picture data for displaying the objects for the right eye. A sub-picture superimposed on a stereoscopic video image can thereby be rendered in the depth direction, and the data size of the sub-picture and the amount of computation required for its display can be reduced.

7 Claims, 13 Drawing Sheets

(51) Int. Cl.
*H04N 19/597* (2014.01)
*H04N 13/00* (2006.01)
*H04N 19/70* (2014.01)

(56) References Cited

U.S. PATENT DOCUMENTS

| | | | |
|---|---|---|---|
| 2006/0023950 A1* | 2/2006 | Auberger et al. | 382/232 |
| 2006/0192776 A1* | 8/2006 | Nomura | H04N 13/0022 345/419 |
| 2006/0203085 A1* | 9/2006 | Tomita | 348/51 |
| 2006/0269226 A1 | 11/2006 | Ito et al. | |
| 2007/0147502 A1* | 6/2007 | Nakamura | 375/240.12 |
| 2008/0192067 A1 | 8/2008 | Barenbrug et al. | |
| 2009/0142041 A1* | 6/2009 | Nagasawa | H04N 13/0033 386/341 |
| 2010/0110163 A1* | 5/2010 | Bruls | H04N 19/597 348/43 |

FOREIGN PATENT DOCUMENTS

| | | |
|---|---|---|
| JP | 11-155155 A | 6/1999 |
| JP | 2004-274125 A | 9/2004 |
| JP | 2004-357156 A | 12/2004 |
| JP | 1501316 A1 | 1/2005 |
| JP | 2005-535203 A | 11/2005 |
| WO | WO 2006/111893 A1 | 10/2006 |

\* cited by examiner

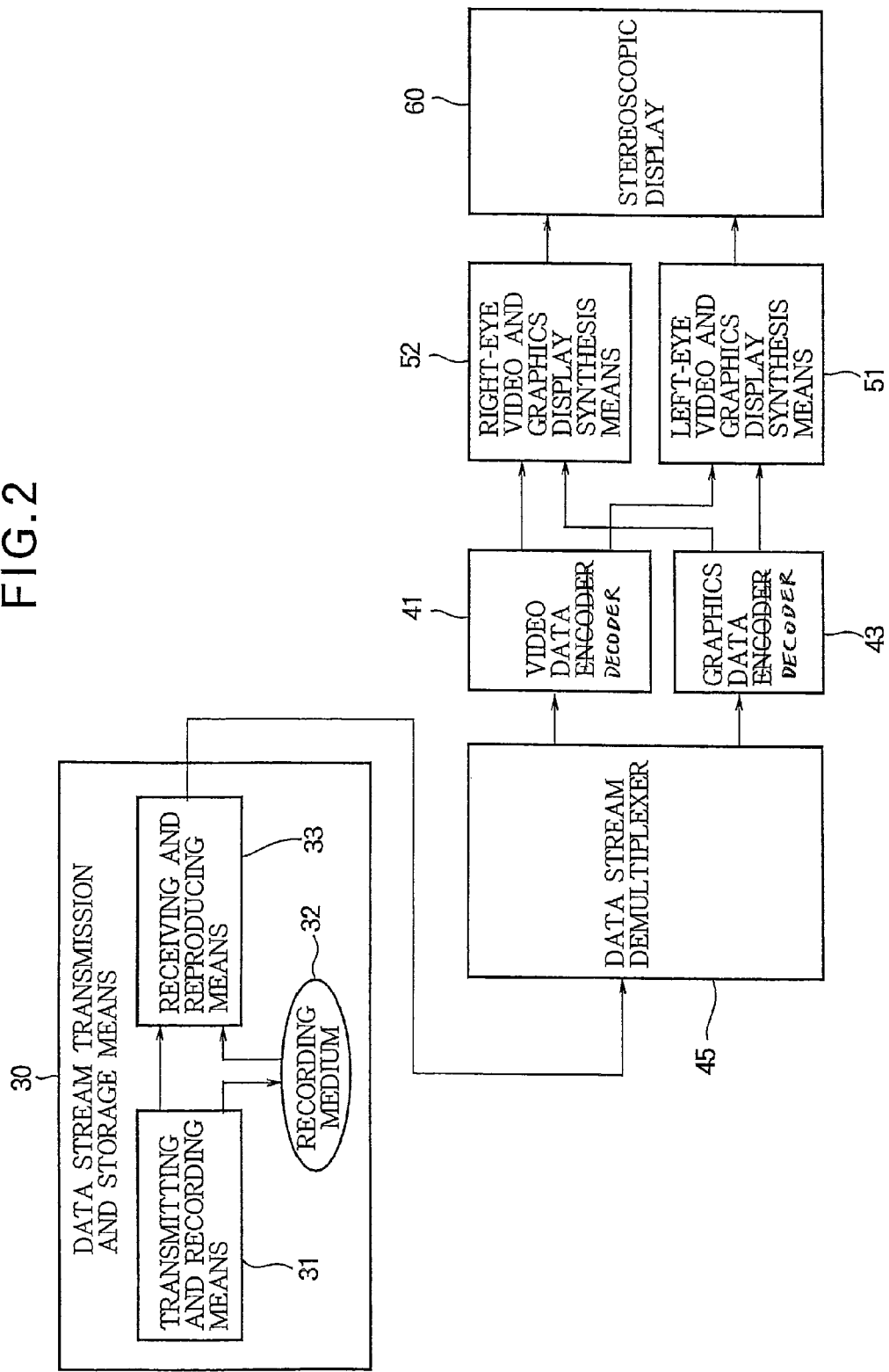

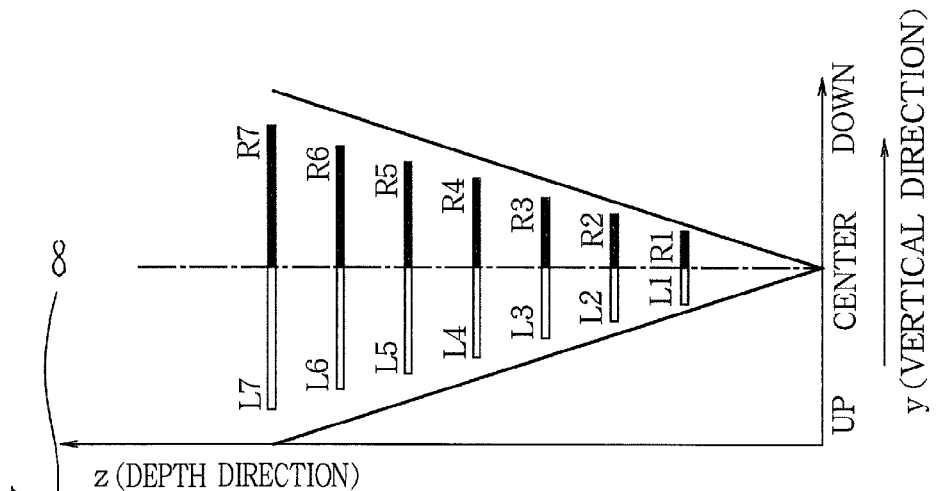
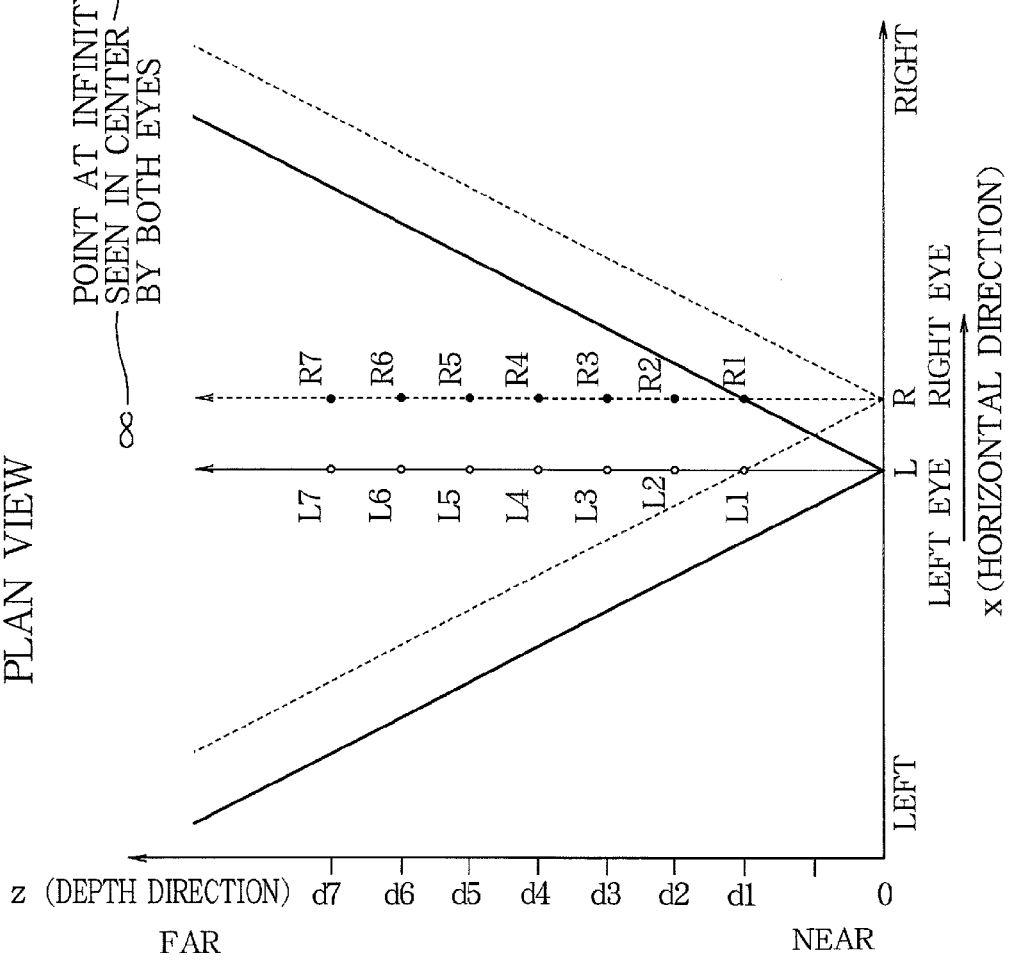

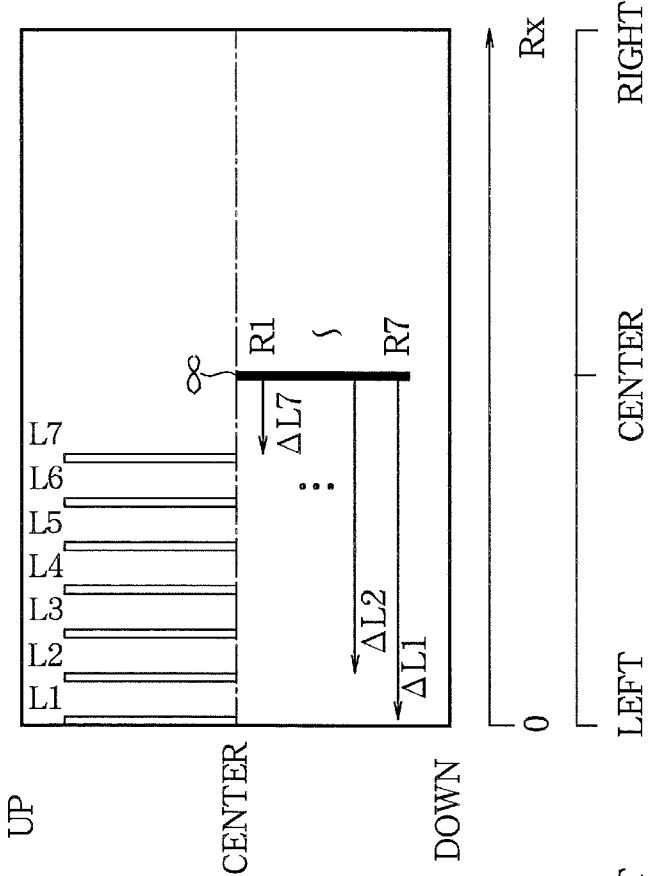
FIG.4 (b) RIGHT-EYE IMAGE
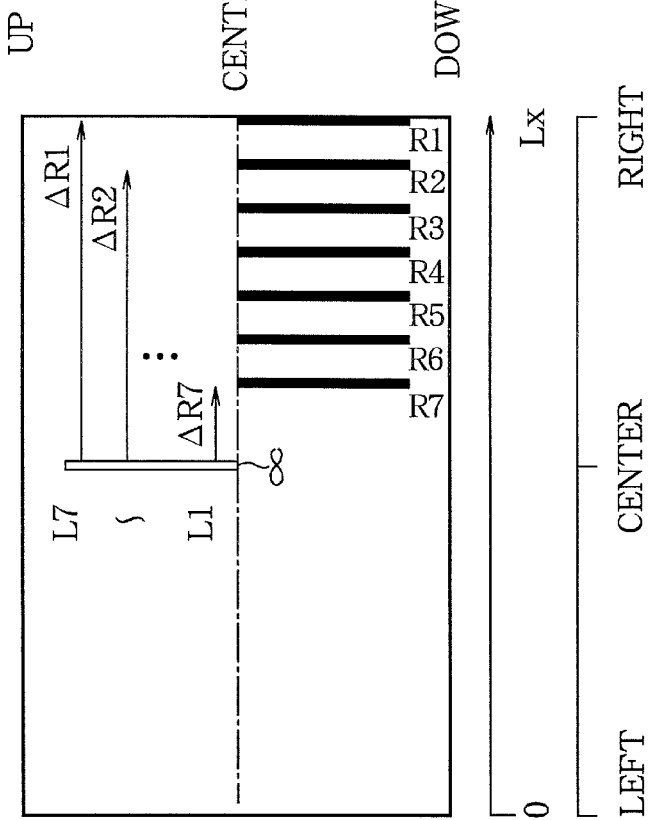
FIG.4 (a) LEFT-EYE IMAGE

LEFT-EYE IMAGE

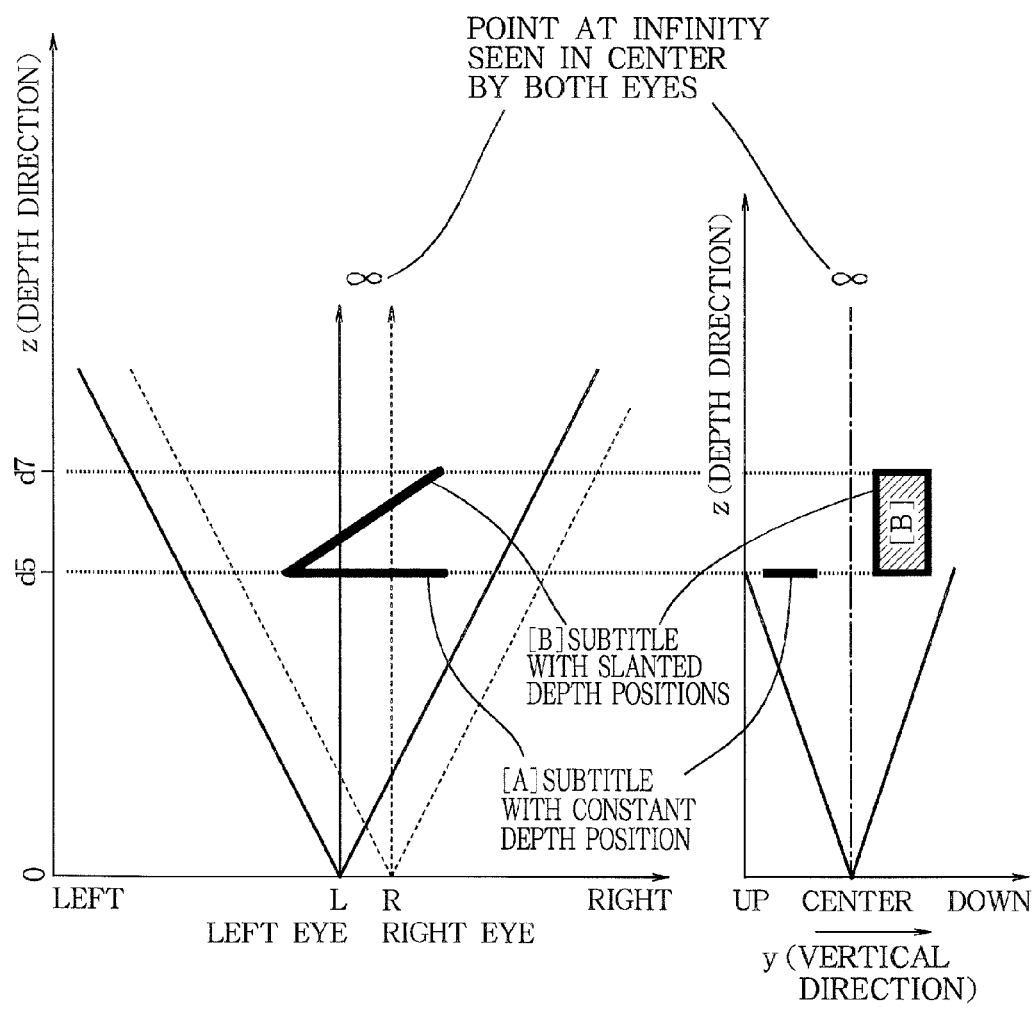
FIG.6(a) PLAN VIEW
FIG.6(b) SIDE VIEW

FIG.7 (b) RIGHT-EYE IMAGE
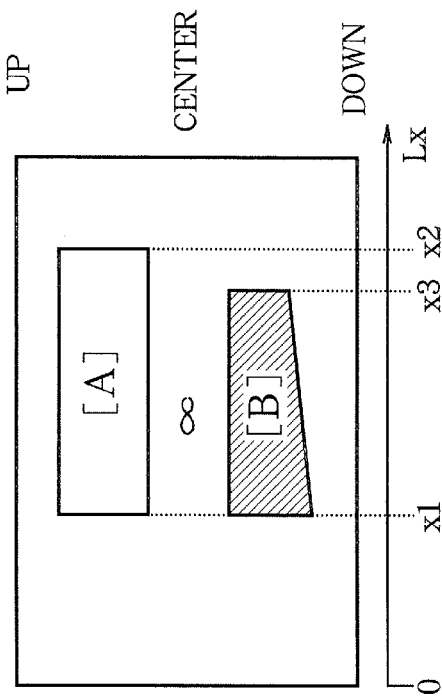
FIG.7 (a) LEFT-EYE IMAGE
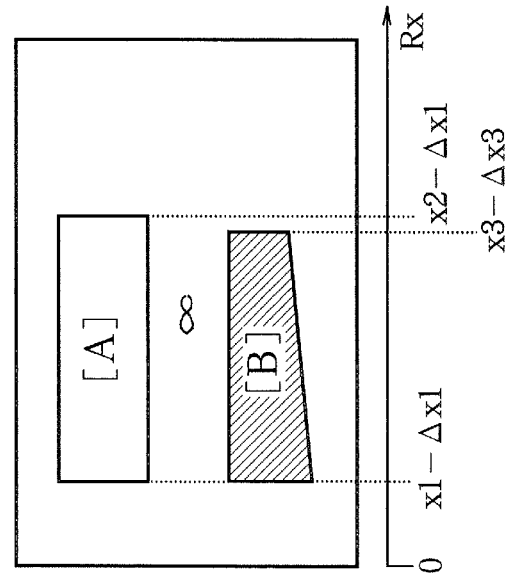

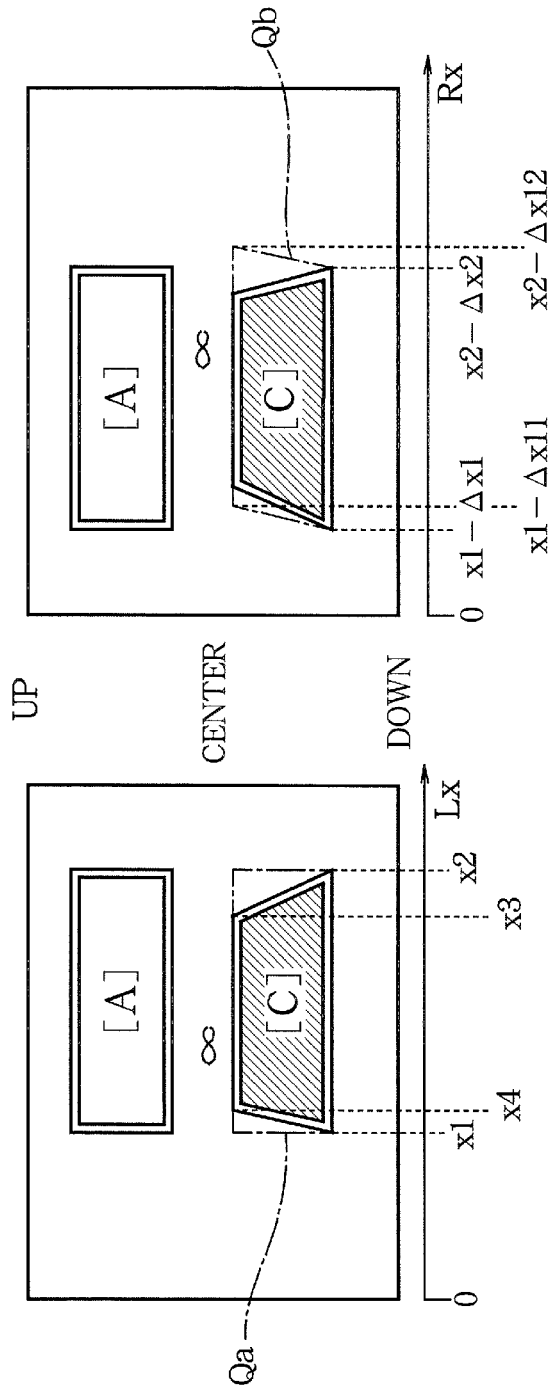

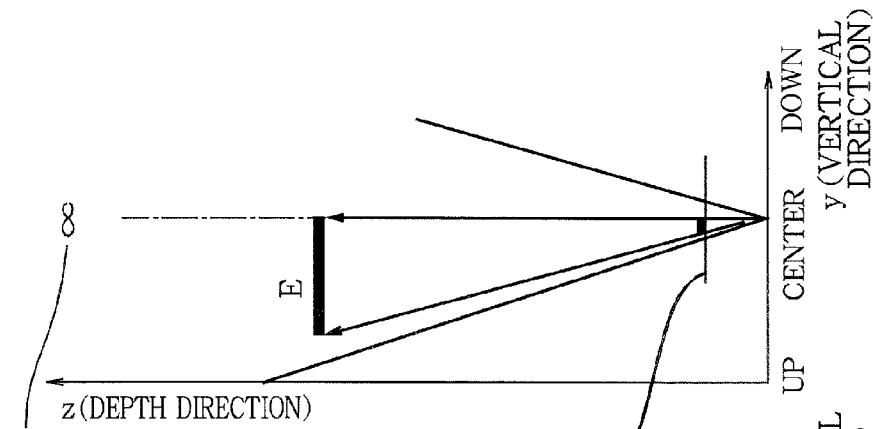
FIG.13(b) SIDE VIEW
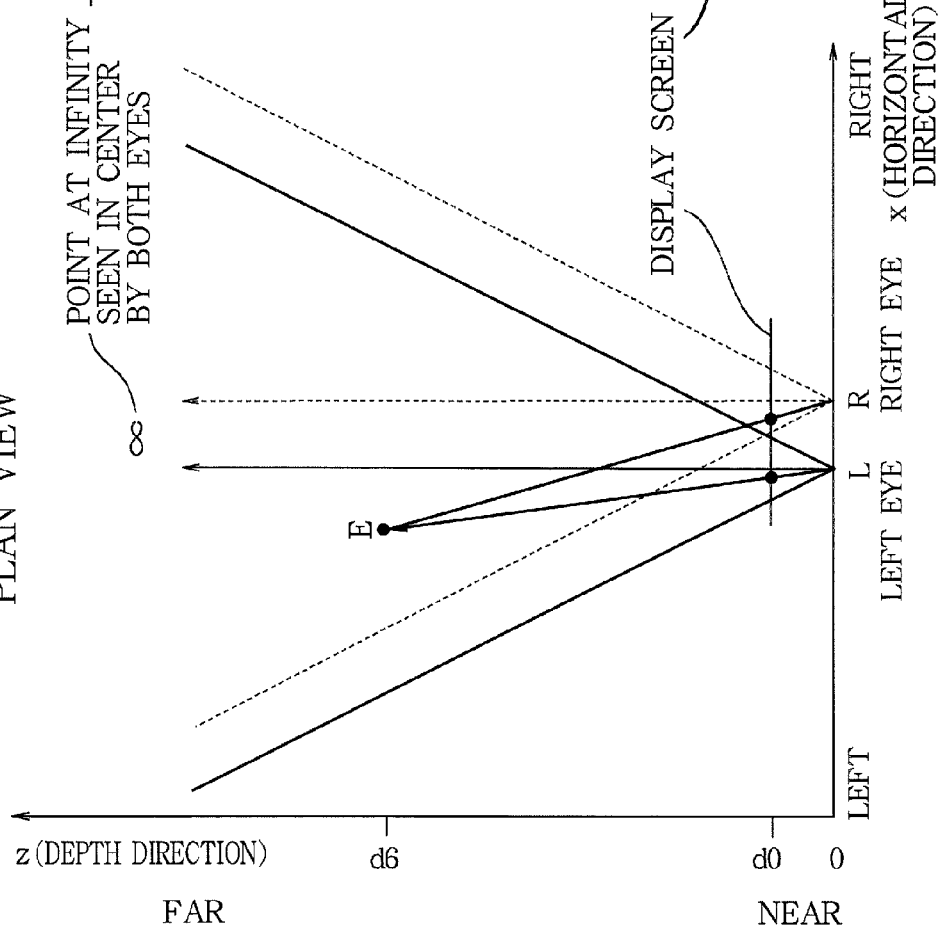
FIG.13(a) PLAN VIEW

VIDEO ENCODING DEVICE, VIDEO ENCODING METHOD, VIDEO REPRODUCING DEVICE, VIDEO REPRODUCING METHOD, VIDEO RECORDING MEDIUM, AND VIDEO DATA STREAM

TECHNICAL FIELD

The present invention relates to a video reproducing device and method for displaying stereoscopic video, a video encoding device and encoding method for creating stereoscopic video, a video recording medium that holds encoded video data, and a video data stream.

BACKGROUND ART

Several methods have been used by video reproducing devices to display stereoscopic video (three-dimensional video). The most widely used method visualizes stereoscopic video by showing separate images for perception by the right and left eyes and giving the right-eye and left-eye images the same parallax as when a person views an actual three-dimensional object.

In order to display real-life video stereoscopically, video images are captured simultaneously by two cameras separated horizontally by a distance corresponding to the distance between the eyes. The reproducing process is contrived so that the left eye sees only the images taken by the left-eye camera and the right eye sees only the images taken by the right-eye camera, creating a binocular parallax that causes the images to be perceived stereoscopically. The disclosed art includes various methods for providing a separate video image perceptible to each eye, for providing high video resolution, for reducing the quantity of data needed to represent the video images, and so on.

There is an increasing demand for the recording of stereoscopic video on media used for providing video content, typically DVD and BD media. These media allow, in addition to the display of the video, e.g., movie, forming the major part of the content data, the superimposed display of sub-pictures for displaying subtitles and the superimposed display of graphics for displaying options, samples, guidance, and the like responsive to user operations. These additional video data are also significant components by which value can be added to the video constituting the main part, thereby enhancing the content data. Since video has traditionally been monoscopic (two-dimensional video), additional video information such as superimposed sub-pictures and graphics have also been monoscopic, but when they are superimposed, it has been possible to display them so as to provide visually impressive effects by setting appropriate transparency values to express foreground-background relationships.

When the video content is stereoscopic, since the expressive effect is limited if the additional video information is monoscopic, there is a need for ways to make it possible to render sub-pictures, graphics, and other additional video data in the depth direction.

When conventional monoscopic subtitles are superimposed on stereoscopic video, a problem has been that the stereoscopic video, having parallax, is displayed stereoscopically but the subtitles are displayed as if they were located at an infinite distance, or that whereas subtitles are consistently displayed in the foreground of the image in a monoscopic display they are displayed in the background in a stereoscopic display, which seems strange to the user. In response to this problem, art has been disclosed that displays subtitles at appropriate positions by providing the subtitle data with parameters indicating the display position in the depth direction and reshaping the subtitles when they are combined for display on a stereoscopic image (refer to Patent document 1, for example).

PRIOR ART REFERENCE

Patent Document

Patent document 1: Japanese Patent Application Publication No. 2004-274125

SUMMARY OF THE INVENTION

Problems to be Solved by the Invention

The prior art makes it is possible to set the subtitle display position at an appropriate foreground position in the video image, but at only one point. As a method of representing a stereoscopic video image, the prior art affords little freedom: no technique is disclosed for setting the display position in the depth direction, so that the subtitle itself can be placed so as to slant back from the foreground toward the background.

The present invention addresses this problem with the object, in a method of visualizing a stereoscopic video image by displaying separate video images to the left and right eyes, of enabling additional video information such as sub-pictures or graphics superimposed on a stereoscopic video image to be expressed in the depth direction as well and viewed stereoscopically.

Another object is to reduce the amount of data used to express the stereoscopically viewable additional video information such as sub-pictures or graphics.

A further object, in a video reproducing apparatus, is to simplify the computational processing for achieving the stereoscopically viewable rendering of video information such as sub-pictures or graphics. A simultaneous object is, by requiring less computational processing performance in the video reproducing apparatus, to reduce its cost, and to improve the refresh rate of video information that is displayed stereoscopically with given computational processing performance.

Means of Solution of the Problems

The inventive video encoding device generates video data for visualization of a stereoscopic video image by display of separate video images for the left and right eyes; the video encoding device includes:

a video encoding means for encoding video signals output by cameras taking pictures from first and second viewpoints horizontally spaced apart by a distance corresponding to a distance between the left and right eyes, thereby generating an encoded video data stream representing the video display images forming the stereoscopic video image;

a sub-video encoding means for encoding data of sub-video display images for the first and the second viewpoints to be displayed superimposed on the video display images for the first and second viewpoints forming the stereoscopic video image, thereby generating an encoded sub-video data stream; and a stream multiplexing means for multiplexing the encoded video data stream generated by the video encoding means and the encoded sub-video data stream generated by the sub-video encoding means; wherein the sub-video encoding means encodes the data of one or more objects included in the sub-video display image for the first viewpoint so that the data can be independently decoded, expresses depth by performing at least one of a shift and an expansion or contraction, in a horizontal direction, of one or more objects included in the sub-video display image for the second viewpoint with respect to corresponding objects included in the sub-video display image for the first viewpoint and displaying the result, and generates data for each of the objects indicating a shift width at a left end and a shift width at a right end, as sub-video display data for the second viewpoint.

The inventive video reproducing device decodes data of a stereoscopic video image including an encoded sub-video image and displays separate video images for the left and right eyes, thereby visualizing a stereoscopic video image; the video reproducing device includes:

a video decoding means for decoding video images for first and second viewpoints, the video images being displayable forming a stereoscopic video image; and a sub-video decoding means for decoding data of sub-video display images for a plurality of viewpoints, the sub-video display images being displayed superimposed on the video display images for the first and second viewpoints forming the stereoscopic video image; wherein the sub-video decoding means independently decodes the data of one or more objects included in the sub-video display image for the first viewpoint, reads a shift width at a left end and a shift width at a right end for each of the objects, generated as the data of the sub-video display image for the second viewpoint, and performs at least one of a shift and an expansion or contraction, in a horizontal direction, of one or more objects included in the sub-video display image for the second viewpoint with respect to corresponding objects included in the sub-video display image for the first viewpoint and displays the result.

Effect of the Invention

According to the present invention, in a method of visualizing a stereoscopic video image by displaying separate video images to the left and right eyes, sub-pictures, graphics, and other auxiliary video information that is superimposed on the stereoscopic video image can be rendered in the depth direction, providing increased freedom in the rendering of stereoscopic video.

According to the present invention, the amount of data used to express stereoscopically viewable auxiliary video information (sub-pictures, graphics, etc.) can be reduced.

Furthermore, according to the present invention, in a video reproducing apparatus, the computational processing for stereoscopic rendering of auxiliary video information (sub-pictures, graphics, etc.) can be simplified.

According to the present invention, it is also possible to reduce the computational processing performance required of a video reproducing apparatus and reduce the cost of the apparatus.

According to the present invention, it is also possible to improve the refresh rate of the display of video information that is displayed stereoscopically with given computational processing performance, and display the video information stereoscopically in a fast-forward mode.

BRIEF DESCRIPTION OF THE DRAWINGS

FIG. 2 is a block diagram illustrating the video reproducing device in the first embodiment of the invention.

FIGS. 3(a) and 3(b) show the relationship between parallax and depth to illustrate the principle of the invention.

FIGS. 4(a) and 4(b) show images illustrating the principle of the invention.

FIGS. 6(a) and 6(b) show an exemplary subtitle configuration used in the first embodiment of the invention.

FIGS. 7(a) and 7(b) show the configurations of the images of the subtitles shown in FIGS. 6(a) and 6(b) for the left and right eyes.

FIGS. 12(a) and 12(b) illustrate an exemplary subtitle configuration used in a third embodiment of the invention.

FIGS. 13(a) and 13(b) show the relationship between parallax and height to illustrate the principle of the invention.

MODES FOR CARRYING OUT THE INVENTION

Embodiments of the invention will now be described with reference to the drawings.

First Embodiment

Figure 1:
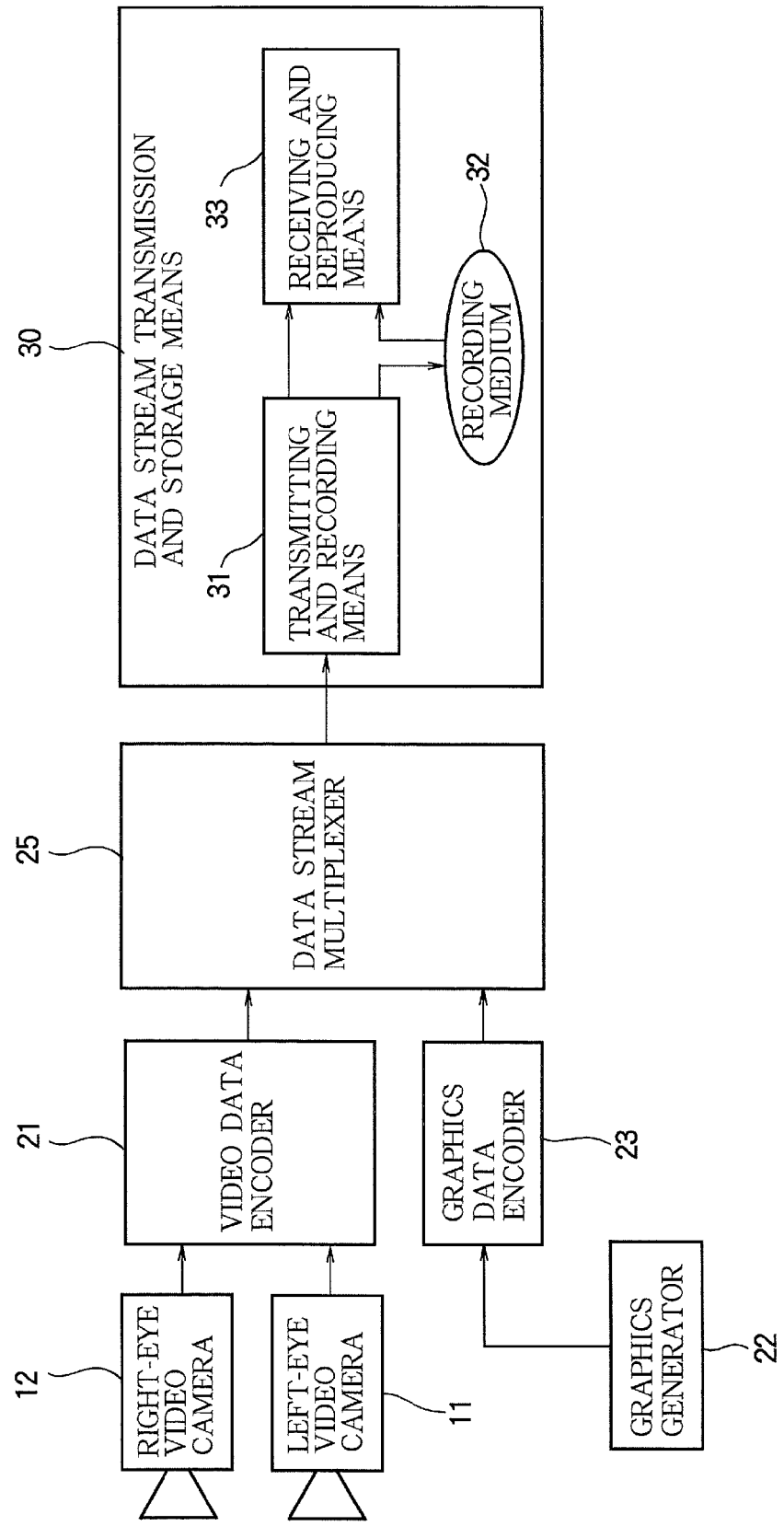
FIG. 1 is a block diagram illustrating the video encoding device in a first embodiment of the invention.

The structure of a system including the video encoding device in the first embodiment of the invention is illustrated in FIG. 1. This device digitally encodes captured stereoscopic video images (referred to as the main video below), generates and digitally encodes sub-video images, and generates a video data stream in which the sub-video is multiplexed with the digitally-coded data of the main video. The sub-video includes video sub-pictures for subtitles or video graphics or the like for displaying options, samples, guidance etc. responsive to operations performed by the user. The main video can be rendered stereoscopically; the sub-video displayed superimposed on the main video is generated and encoded so that it can also be rendered in the depth direction and viewed stereoscopically. The video encoding device includes a video encoder 21 (video encoding means) connected to a left-eye video camera 11 and a right-eye video camera 12, a graphics generator 22, a graphics data encoder 23 (sub-video encoding means), and a data stream multiplexer 25 (stream multiplexing means). A transmitting and recording means 31 in a data stream transmission and storage means 30 is also part of the video encoding device.

The main video is taken by simultaneous use of the left-eye camera 11 and the right-eye camera 12, these two cameras being horizontally separated by a distance equivalent to the distance between the two eyes. The video signals captured by the cameras are input to the video encoder 21, in which they are digitally encoded to form an encoded main video data stream. Plural methods for digitally encoding stereoscopic video are known; the present invention is not limited to any specific method.

The sub-video is created by the graphics generator 22 according to a specification provided by the content producer, and output as digitized sub-video data. The sub-video data include image data, such as sub-pictures and graphics to be displayed as the sub-video image, as well as positional information about the depth directional position at which each of the objects included in the sub-video image is to be displayed.

The sub-video data created by the graphics generator 22 may be created in the shape seen from the viewpoint of the viewer. For example, when an object to be displayed has a square shape, if the object is not equidistant from this viewpoint but is angled in the depth direction, the object appears to have a trapezoidal or scalene quadrilateral shape, and the sub-video data are generated so that the object is seen in that shape. Positional information indicating how the object is to be placed in the depth direction is added.

Next, the sub-video data are input to the graphics data encoder 23 and encoded as sub-video for the left and right eyes. If the left-eye and right-eye viewpoints are generalized as a first viewpoint and a second viewpoint, and the left eye is assigned to the first viewpoint, which is the reference viewpoint, then the data of the objects included in the left-eye sub-video image are encoded so that they can be independently decoded and displayed.

The sub-video image for the second viewpoint is generated with reference to the sub-video image for the first viewpoint. In this case, the second viewpoint is positioned at the right eye. The binocular parallax between the left and right eyes enables the display of an object included in the right-eye sub-video image with a sense of depth just by expanding or contracting and shifting the object in the horizontal direction with respect to the object displayed as the left-eye sub-video image. Accordingly, in order to express the right-eye sub-video image, all that is needed is to generate shift width data indicating how far the left and right ends of each object should be shifted from their horizontal positions when displayed for the left eye, and to associate or attach these data to the object. For example, the data may be held as part of the data stream.

This principle will be described in more detail later.

The encoded sub-video data generated in the graphics data encoder 23 in this way are input to a data stream multiplexer 25 together with the encoded main video data generated in the video encoder 21. The data stream multiplexer 25 multiplexes the two types of encoded data to generate a multiplexed encoded data stream. In this embodiment, the main video and sub-video are time-stamped for simultaneous superimposed display on the screen and are combined into a multiplexed encoded data stream in such a way that they can be displayed without data underrun or other errors.

The multiplexed encoded data stream is input to the data stream transmission and storage means 30. If the data stream transmission and storage means 30 has the transmitting function of the functional block indicated as the transmitting and recording means 31, it modulates the multiplexed encoded data stream for transmission and transmits the modulated data stream to the receiving function of the distant functional block indicated as a receiving and reproducing means 33. If the data stream transmission and storage means 30 has the recording function of the functional block indicated as the transmitting and recording means 31, it modulates the multiplexed encoded data stream for storage and records and stores it in a recording medium 32. Only one of the transmitting function and the recording function is required, whichever is necessary.

FIG. 2 illustrates the structure of a system including the video reproducing device in the first embodiment of the invention. This device decodes the multiplexed encoded data stream encoded by the video encoding device according to the description in FIG. 1 and input to the data stream transmission and storage means 30 to obtain main video or stereoscopic video images and sub-video images that can be rendered in the depth direction and viewed stereoscopically, and reproduces video images in which they are superimposed. The device includes a data stream demultiplexer 45, a video data decoder (video decoding means) 41, a graphics data decoder (sub-video decoding means) 43, a right-eye video and graphics display synthesis means 52, a left-eye video and graphics display synthesis means 51, and a stereoscopic display 60. The receiving and reproducing means 33 of the data stream transmission and storage means 30 also constitutes part of the video reproducing device.

If the data stream transmission and storage means 30 has the receiving function of the functional block indicated as the receiving and reproducing means 33, it uses the receiving function to receive the multiplexed encoded data stream transmitted by the transmitting function, decodes the data stream, and inputs the decoded data stream to the data stream demultiplexer 45. If the data stream transmission and storage means 30 has the reproducing function of the functional block indicated by the receiving and reproducing means 33, it uses the reproducing function to read the multiplexed encoded data stream stored in the recording medium 32, decodes the data stream, and inputs the decoded data stream to the data stream demultiplexer 45. Only one of the receiving function and the reproducing function is required, whichever is necessary.

The data stream demultiplexer 45, referring to attribute information added to the streams, separates the encoded main video data stream and the encoded sub-video data stream from the multiplexed encoded data stream, and outputs them separately. The encoded main video data stream is input to the video data decoder 41; the encoded sub-video data stream is input to the graphics data decoder 43.

The video data decoder 41 decodes the main video data and reproduces the decoded data as the main video data for the left eye and for the right eye. The decoded left and right eye video data thus obtained are sent to the left-eye video and graphics display synthesis means 51 and the right-eye video and graphics display synthesis means 52, respectively. The decoding method in the video data decoder 41 is not limited to any specific video coding method in the present invention; any method may be used if it corresponds to the encoding method used by the video encoder 21.

The graphics data decoder 43 decodes the encoded sub-video data stream, and reproduces the data stream as sub-video data for the left eye and the right eye. The decoding method in the graphics data decoder 43 corresponds to the encoding method used by the graphics data encoder 23.

As described above, when the left eye is set as the first viewpoint, which is the reference viewpoint, the data of the objects included in the left-eye sub-video image can be independently decoded, so these data are output without change as the left-eye sub-video data.

The objects included in the sub-video image for the right eye, which is the second viewpoint, are shifted and expanded or contracted in the horizontal direction with respect to the objects displayed as the left-eye sub-video image and displayed to provide a sense of depth. Each object has a shift width given as data indicating how far the display positions of its left and right ends should be shifted from the horizontal positions at which they are displayed for the left eye, so the shift widths are read out and the display positions are calculated. A stereoscopic effect due to binocular parallax between the left and right eyes can be recreated in this way.

The video signals are displayed by sequentially scanning the screen from top to bottom in horizontal scanning lines, so it is extremely easy to shift the display content in each scanning line to render the object. Expansion and contraction in the horizontal direction are implemented just by varying the shift width depending on the position of each point on one scanning line, so they can also be implemented without difficulty by simple computational processing.

The decoded left-eye and right-eye sub-video data thus obtained are sent to the left-eye video and graphics display synthesis means 51 and the right-eye video and graphics display synthesis means 52, respectively. The left-eye video and graphics display synthesis means 51 and right-eye video and graphics display synthesis means 52 superimpose the restored sub-video images on the main video images according to the prescribed specification and send the superimposed data to the stereoscopic display 60 as a video image display signal. The viewer perceives the signal as stereoscopic video through the stereoscopic display 60.

The depth feeling given by the stereoscopic display of the main video and the depth feeling given by the stereoscopic display of the sub-video are adjusted in the authoring stage by the content producer. Besides rendering foreground-background relationships basically by depth-directional positions, it is also possible to render the sub-video with color information and transparency information, and represent foreground-background relationships with the main video, which forms the background, by mixing the sub-video with the main video at an increasing transparency level with increasing distance.

The principle by which binocular parallax between the left and right eyes enables the rendering of depth for objects in the left-eye sub-video image just by displaying the corresponding objects in the right-eye sub-video image with a horizontal shift, expansion, or contraction, and the relationship between the depth-directional position and horizontal shift width will now be described in detail.

FIGS. 3(a) and 3(b) are diagrams illustrating the relationship between binocular parallax and depth that forms the principle of the invention. FIG. 3(a) is a plan view of the entire video viewspace, including the cameras, that is, the viewer's viewpoints; FIG. 3(b) is a side view of this space. The x-axis extends in the horizontal direction (positive toward the right) and the z-axis in the depth direction (positive toward the back) as shown in FIG. 3(a); the y-axis extends in the vertical direction (positive downward) as shown in FIG. 3(b). The viewpoints of the left and right eyes, that is, the left-eye and right-eye cameras, are respectively positioned at points L and R on the x-axis, at distance z=0. The lines of sight from the left eye L and right eye R are centered on a point at infinity located in the direction of the solid and dotted lines indicated with arrows in the diagrams. As shown in FIG. 3(a), the horizontal range of the visual field of left eye L is a sector (solid lines) that widens in the depth direction; the horizontal range of the visual field of right eye R is another sector (dotted lines) that widens in the depth direction.

Distance from the viewpoints in the depth direction will be referred to simply as 'distance' below. Objects L1, L2, L3, L4, L5, L6, L7 are positioned at distances d1, d2, d3, d4, d5, d6, d7, respectively, on the central line of sight from the left eye L. Objects R1, R2, R3, R4, R5, R6, R7 are positioned at distances d1, d2, d3, d4, d5, d6, d7, respectively, on the central line of sight from the right eye R. Objects L1, L2, L3, L4, L5, L6, L7 are white bars extending orthogonally upward from the central line, the lengths of the bars increasing with distance. Objects R1, R2, R3, R4, R5, R6, R7 are black bars extending orthogonally downward from the central line, the lengths of the bars increasing with distance. How these objects appear when viewed from the viewpoints of the left eye L and right eye R will now be considered.

FIGS. 4(a) and 4(b) are diagrams showing exemplary images for the left and right eyes that illustrate the principle of the invention. FIG. 4(a) shows the image viewed by the left eye L, that is, the image to be reproduced and displayed for the left eye; FIG. 4(b) shows the image viewed by the right eye R, that is, the image to be reproduced and displayed for the right eye. The pairs of objects L1 and R1, L2 and R2, etc. at mutually identical distances from the viewpoints are equally spaced, but in the images seen from the viewpoints, following the law of perspective, nearer objects appear to be more widely spaced.

Seen by the left eye, as shown in FIG. 4(a), objects L1, L2, L3, L4, L5, L6, L7 all appear to be at the horizontal center. Objects R1, R2, R3, R4, R5, R6, R7 are seen at positions shifted to the right from the horizontal center direction by amounts $\Delta R1$, $\Delta R2$, $\Delta R3$, $\Delta R4$, $\Delta R5$, $\Delta R6$, $\Delta R7$, respectively. The use of the image for the left eye L to generate the image for the right eye R in FIG. 4(b) will now be considered.

Objects L1, L2, L3, L4, L5, L6, L7, which appear to be horizontally centered when seen by the left eye L, are seen by the right eye R at positions shifted to the left by $\Delta L1$ $\Delta L2$, $\Delta L3$, $\Delta L4$, $\Delta L5$, $\Delta L6$, $\Delta L7$, respectively, from their horizontal positions in the image for the left eye L.

Objects R1, R2, R3, R4, R5, R6, R7, which are seen at positions shifted horizontally to the right when viewed by the left eye L, are seen centrally superimposed in the horizontal direction when viewed by the right eye R. That is, they appear to be shifted to the left by $\Delta R1$, $\Delta R2$, $\Delta R3$, $\Delta R4$, $\Delta R5$, $\Delta R6$, $\Delta R7$, respectively, from their horizontal positions in the image for the left eye L.

This shows that when the image for the right eye R is generated by using the image for the left eye L, the horizontal shift width of the position of an object increases as the object becomes nearer, and decreases as the object becomes more distant; at the point of infinity, the object remains in the same position. Designating a horizontal shift width corresponding to the position of each of these objects in advance makes it possible to render the images with left-right binocular parallax by creating the image for right eye R from the image for left eye L, thereby recreating a sense of distance in the depth direction. That is, a stereoscopically viewable image can be generated.

Figure 5A:
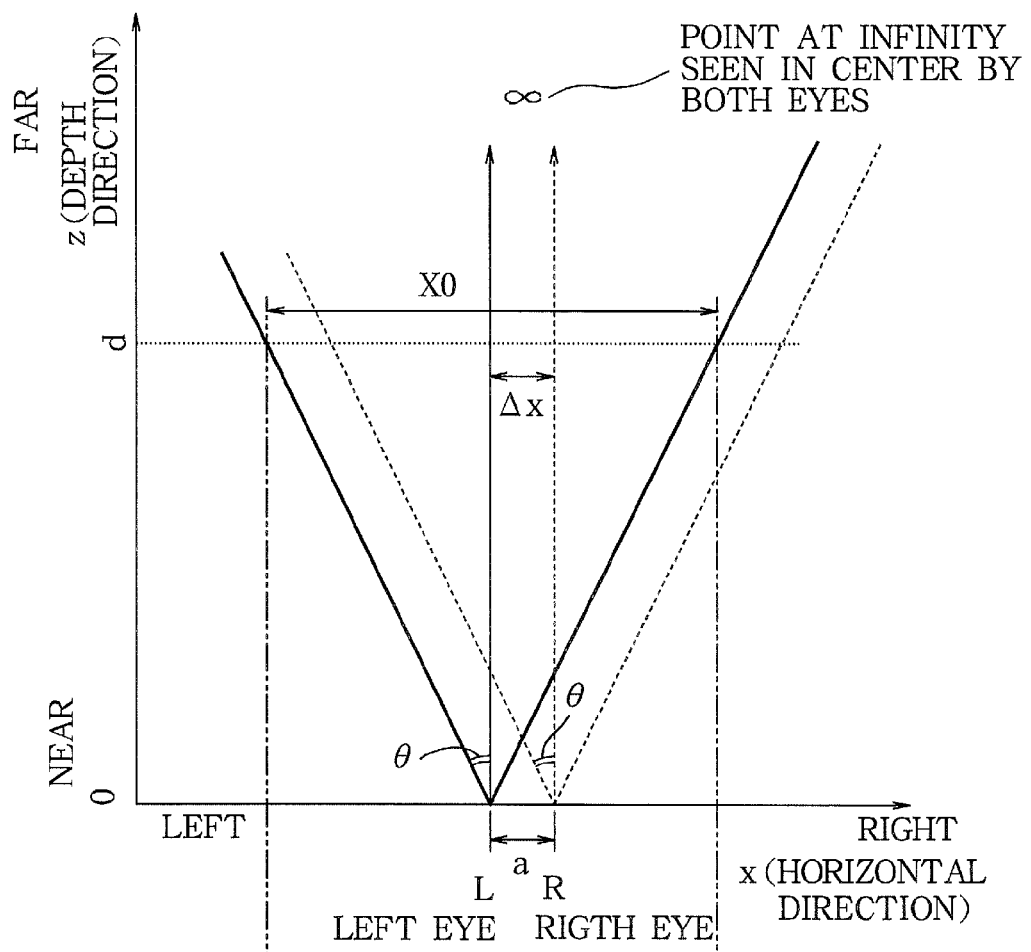
FIGS. 5(a) and 5(b) show the quantitative relationship between parallax and distance to illustrate the principle of the invention.
Figure 5B:
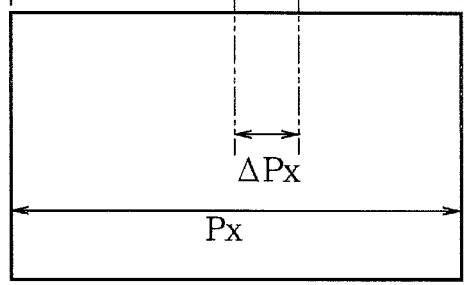

FIGS. 5(a) and 5(b) are diagrams showing the quantitative relationship between binocular parallax and distance to illustrate the principle of the invention. FIG. 5(a), like FIG. 3(a), is a plan view of the entire video viewspace, including the viewpoints of the viewer's eyes. The x-axis, the z-axis, the left-eye and right-eye viewpoints, the central lines of sight, and the visual field ranges are shown in the same way as in FIG. 3(a). FIG. 5(b) illustrates the left-eye image. In FIGS. 5(a) and 5(b), $2\theta$ is the horizontal view angle of the cameras, d represents distance from the cameras, a is the binocular spacing, X0 is a visual field width in the horizontal direction, $\Delta x$ is the binocular parallax, Px is the number of pixels in the horizontal direction, and $\Delta Px$ is the number of pixels in the horizontal direction corresponding to the binocular parallax $\Delta x$.

The relative length $\Delta x$ (referred to as the binocular parallax) of the binocular spacing a in the horizontal visual field width X0 with a horizontal view angle $2\theta$ in the vertical plane at a distance d from each of the left and right eye cameras is determined as follows:

$$\frac{\Delta x}{X0} = \frac{a}{2d\tan\theta} \quad (1)$$

Next, the binocular parallax Δx caused by the binocular spacing a is converted to the number of pixels ΔPx in the horizontal direction on the camera screen or display screen. If the screen size (the number of pixels) in the horizontal direction is Px and Px is 1920 pixels, ΔPx is calculated as follows.

$$\Delta Px = Px \cdot \left(\frac{\Delta x}{X0}\right) \quad (2)$$

$$= 1920 \cdot \left(\frac{a}{2d\tan\theta}\right)$$

Conversely, from expression (2), the distance d in the depth direction can be calculated as follows from the horizontal view angle 2θ of the cameras, the binocular spacing a, and the number of pixels ΔPx in the horizontal direction on the display screen corresponding to the binocular parallax Δx.

$$d = \left(\frac{a}{2\tan\theta}\right) \cdot \left(\frac{1920}{\Delta Px}\right) \quad (3)$$

When the stereoscopic image is produced, the parameter relations shown above can be used to generate the image for the right eye R by using the image for the left eye L. Given the view angle and distance between the cameras and the size of the screen (the number of pixels), horizontal shift widths can be quantitatively calculated and specified in pixel units from the positions of objects in the image for the left eye L to generate the image for the right eye R.

The calculated shift width ΔPx can be specified in advance for each object or for the given position of each object to create an image that produces a sense of distance in the depth direction when reproduced.

In some video scenes, a and θ can been treated as fixed parameters, so the depth directional distance d determined from expression (3) varies only with the value of θPx for each part of the object.

Accordingly, when two objects are placed so that they overlap, for example, the value of θPx can be used to decide which overlapping part is to be displayed in front of the other. For opaque objects, the object behind is hidden; in the overlapping part, the part with the larger ΔPx value is displayed in front while the part with a smaller ΔPx value is hidden.

When this processing is carried out in the inventive video encoding device, the graphics generator 22 generates the image data for the left eye L and outputs the data to the graphics data encoder 23, together with the depth directional distance for a given position in the image, the view angle of the cameras, and the screen size. The graphics data encoder 23 uses expression (2) to calculate ΔPx as described above for the given part of the image and the designated distance, thereby generating and encoding the image for the right eye R.

Next, based on the above principle, a specific example of the actual rendering of a sub-video image will be described.

FIGS. 6(a) and 6(b) shows an exemplary subtitle arrangement used in the first embodiment. Like FIGS. 3(a) and 3(b), FIGS. 6(a) and 6(b) are a plan view and a side view of the entire video viewspace, including the viewer's viewpoints. The x-axis, z-axis, left-eye and right-eye viewpoints, central lines of sight, and visual field ranges are shown in the same way as in FIGS. 3(a) and 3(b). In these diagrams, a rectangular subtitle 'A' is placed orthogonally at a distance d5 as viewed from these viewpoints, and a rectangular subtitle 'B' is placed at distances d5 to d7 with its right side at a greater depth as viewed from the same viewpoints. As can be seen from the side view, subtitle 'A' is located at a position above center and subtitle 'B' is located at a position below center. How these two subtitles appear from the viewpoints of the two eyes, that is, how the subtitles should be displayed on the screen, will be considered with reference to FIGS. 3(a) and 3(b).

FIGS. 7(a) and 7(b) illustrate the appearance of the subtitle images for the left and right eyes shown in FIGS. 6(a) and 6(b). As show in FIG. 7(a), the orthogonally placed rectangular subtitle 'A' appears rectangular to the left eye L; the laterally inclined rectangular subtitle 'B' appears trapezoidal to the left eye L. The left sides of the two subtitles are both horizontally positioned at x1. Their right sides are, in actuality, also at identical horizontal positions, but in the image, the right side of subtitle 'A' at distance d5 appears at x2 and the right side of subtitle 'B' at distance d7 appears at x3.

As shown in FIG. 7(b), the orthogonally positioned rectangular subtitle 'A' appears rectangular to the right eye R; the laterally inclined rectangular subtitle 'B' appears trapezoidal to the right eye R. The left sides of the two subtitles are both horizontally positioned at (x1−Δx1). Their right sides are, in actuality, also at identical horizontal positions, but in the image, the right side of subtitle 'A' at distance d5 appears at (x2−Δx1) and the right side of subtitle 'B' at distance d7 appears at (x3−Δx3).

In order to create the right-eye image according to the left-eye image, subtitle 'A' is shifted as a whole toward the left by Δx1; the left side of subtitle 'B' is shifted toward the left by Δx1 and the right side of subtitle 'B' is shifted toward the left by Δx3. In this example, Δx1>Δx3; the further back and farther away the right side is, the smaller its shift width Δx3 becomes.

As a result, the width of subtitle 'A' is identically (x2−x1) for the left eye L and the right eye R, but the width of subtitle 'B' is (x3−x1) for the left eye L and (x3−x1)−(Δx3−Δx1) for the right eye R and accordingly looks longer when viewed from the right eye R, due to the effect of binocular parallax.

If there is a difference between the depth-directional distances of the left and right parts of an object to be displayed, then when the graphics data encoder 23 carries out the encoding process, if it calculates the shift widths Δx1 and Δx3 by which the positions of the left and right ends are to be shifted and places the results in the encoded sub-video data, the right-eye image can be rendered with reference to the left-eye image. In the decoding process carried out in the graphics data decoder 43, use of the encoded sub-video data makes it possible to reproduce the object to be displayed as the right-eye image from the left-eye image data and the shift widths Δx1 and Δx3.

Figure 8:
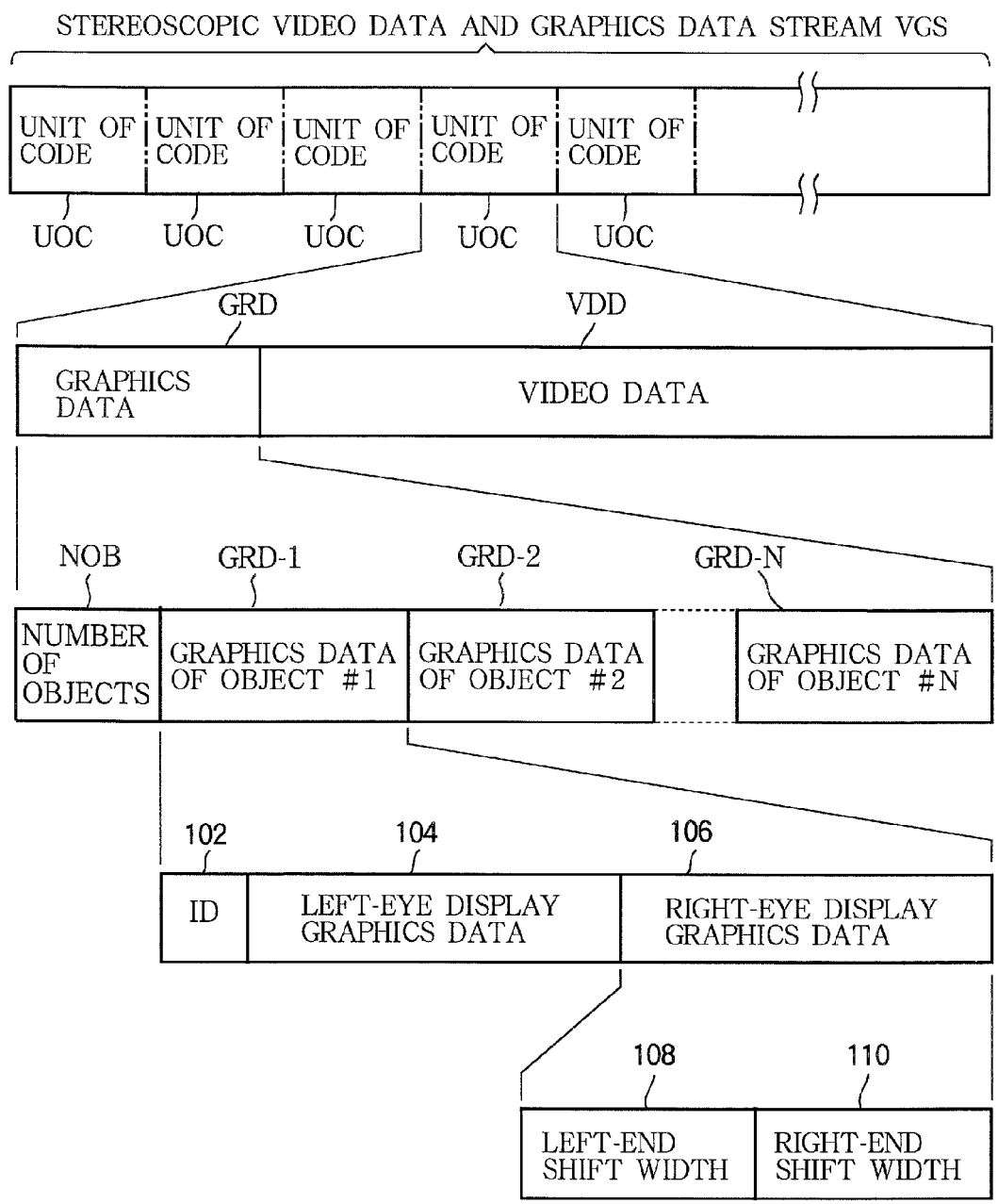
FIG. 8 illustrates the encoded video data structure for the example in FIGS. 6(a) and 6(b).

FIG. 8 illustrates the data structure of the encoded video data in the example shown in the FIGS. 6(a) and 6(b). The entire structure of the data stream for the encoded video, including the main video and the sub-video, is shown. The entire video data stream is referred to as the 'stereoscopic video data and graphics data stream' VGS. The 'stereoscopic video data and graphics data stream' VGS is partitioned, digitized, and encoded in given 'units of code' UOC. The data stream multiplexer 25 multiplexes the stream so that a single unit of code UOC includes both 'video data' VDD comprising the encoded main video data and 'graphics data' GRD comprising the encoded sub-video data.

If, during the reproduction and display of the data of one unit of code UOC of data, the data of the following unit of code UOC are read, it is possible to display the data of the following unit of code UOC without interruption after the display of the first unit of code UOC is completed. The data arrangement shown in FIG. 8 is exemplary, however; if a large buffer memory is provided for the graphics data GRD, for example, graphics data GRD need not necessarily be included in all encoding units UOC.

The data of all objects to be displayed as the sub-video image are stored in the graphics data GRD. The storage structure is shown in the drawing. The 'number of objects' NOB indicates the number of objects included in the unit of code UOC of the graphics data GRD. When the number of objects NOB is N, the graphics data of objects #1 to #N are stored in 'graphics data of object #1' GRD-1 to 'graphics data of object #N' GRD-N.

The graphics data GRD-n (n=1, 2, ..., N) for each object starts with an 'ID' 102 for identifying the object, followed by 'left-eye display graphics data' 104 and then 'right-eye display graphics data' 106. The 'right-eye display graphics data' 106 consist of a 'left-end shift width' 108 and a 'right-end shift width' 110. Both of these are shift-width data needed to reproduce the object to be displayed in the right-eye image from the object to be displayed in the left-eye image as described above, corresponding to Δx1 and Δx3 in the example in FIGS. 7(a) and 7(b).

In the case described above the right and left ends of the object are assumed to be placed at mutually differing positions in the depth direction, and accordingly mutually differing values are set as the 'left-end shift width' 108 and the 'right-end shift width' 110 for the 'right-eye display graphics data' 106. If it is known in advance that the entire object is placed at a uniform position in the depth direction, of course, the same value is set as the 'left-end shift width' 108 and 'right-end shift width' 110. In this case the 'right-eye display graphics data' 106 define a single 'shift width'.

Second Embodiment

Figure 9:
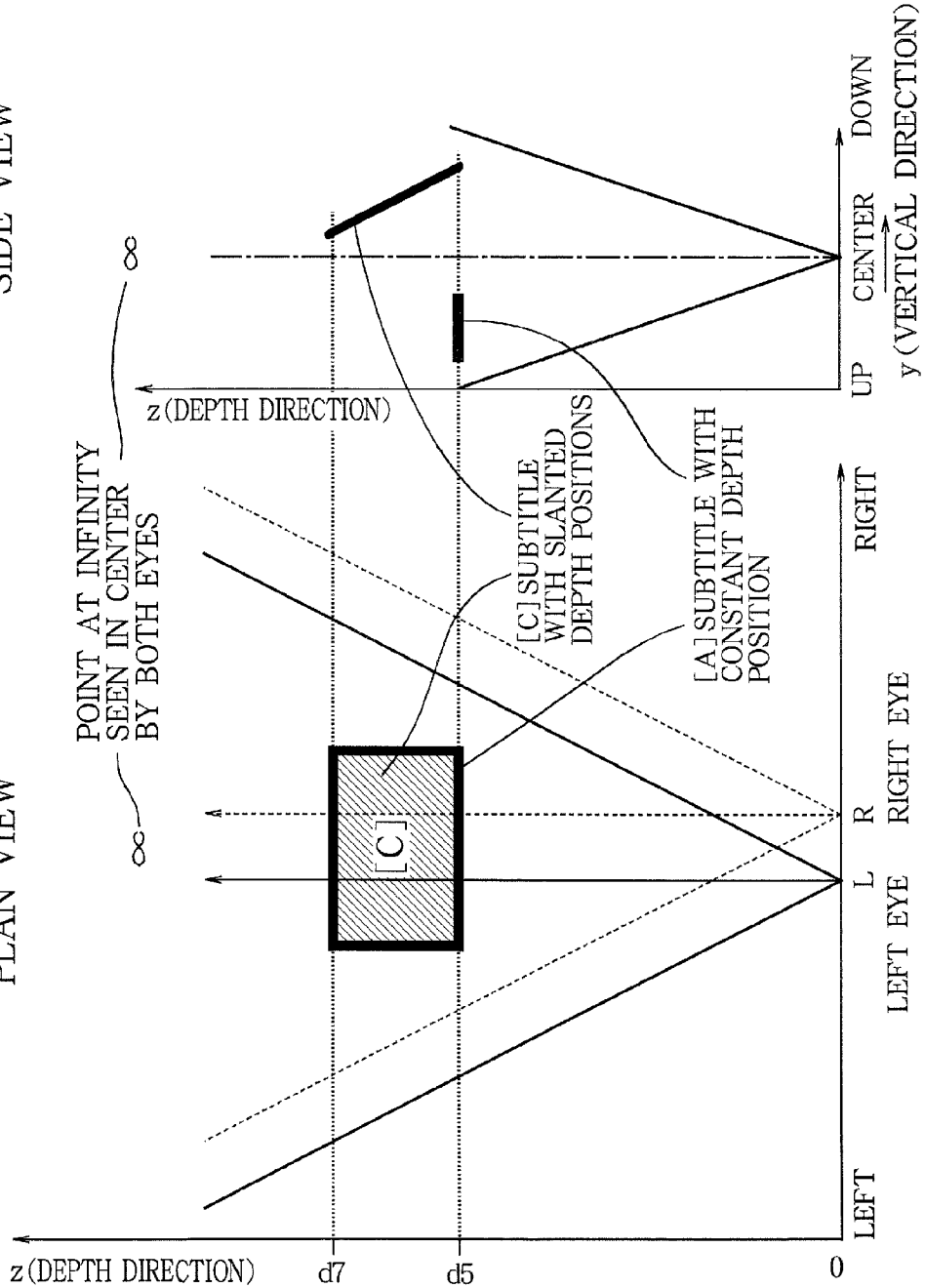
FIGS. 9(a) and 9(b) illustrate an exemplary subtitle configuration used in a second embodiment of the invention.

FIGS. 9(a) and 9(b) show an exemplary subtitle arrangement used in the second embodiment of the invention. Like FIGS. 6(a) and 6(b), FIGS. 9(a) and 9(b) are respectively a plan view and a side view of the entire viewspace, including the viewer's viewpoints. The location of subtitle 'A' is the same as in the example shown in FIGS. 6(a) and 6(b). A rectangular subtitle 'C' is located at distances from d5 to d7, tilted with its upper side at a greater depth as viewed from the viewpoints. As shown in the side view, subtitle 'A' is located at a position above center, and subtitle 'C' is located at a position below center. How these two subtitles appear from the viewpoints of the two eyes, that is, how the subtitles should be displayed on the screen, will be considered as in FIGS. 6(a) and 6(b).

FIGS. 10(a) and 10(b) illustrate the appearance of the subtitle images for the left and right eyes shown in FIGS. 9(a) and 9(b). As show in FIG. 10(a), the orthogonally placed rectangular subtitle 'A' appears rectangular to the left eye L; the tilted-back rectangular subtitle 'C' appears trapezoidal to the left eye L. The left and right ends of the lower sides of both subtitles are at distance d5, and are horizontally positioned at x1 and x2. The left and right ends of the upper side of subtitle 'A' are also at distance d5 and also appear at x1 and x2, like the ends of the lower side, but the upper left and right ends of subtitle 'C' are located at distance d7 and appear at x4 and x3, respectively.

As shown in FIG. 10(b), the orthogonally placed rectangular subtitle 'A' appears rectangular to the right eye R; the tilted-back rectangular subtitle 'C' appears trapezoidal to the right eye R. The lower left and right ends of the two subtitles are both horizontally positioned at (x1−Δx1) and (x2−Δx1). The left and right ends of the upper side of subtitle 'A' appear at (x1−Δx1) and (x2−Δx1), the same as the lower side, but the upper left and right ends of subtitle 'C' are located at distance d7 and appear at (x4−Δx3) and (x3−Δx3).

To generate the right-eye image from the left-eye image, subtitle 'A' is shifted in its entirety by Δx1 to the right. The lower left and right ends of subtitle 'C' are both shifted by Δx1 to the left and the upper left and right ends of subtitle 'C' are both shifted by Δx3 to the left. In this example, Δx1≥Δx3; the further back and farther away the upper side is, the smaller shift width Δx3 becomes.

As a result, the width of subtitle 'A' is identically (x2−x1) for the left eye L and right eye R; there is a difference between the appearances of subtitle 'C' viewed from the left and right eyes due to the effect of binocular parallax, but its lower width is identically (x2−x1) and its upper width is identically (x3−x4) for the left eye L and right eye R.

If there is a difference between the depth-directional distances of the upper and lower sides of an object to be displayed, then when the graphics data encoder 23 carries out the encoding process, if it calculates the shift widths Δx1 and Δx3 by which the positions of the left and right ends are to be shifted and places the results in the encoded sub-video data, the right-eye image can be rendered with reference to the left-eye, image. In the decoding process carried out in the graphics data decoder 43, use of the encoded sub-video data makes it possible to reproduce the object to be displayed as the right-eye image from the left-eye image data and the shift widths Δx1 and Δx3.

This can be summarized as follows in combination with the example in FIGS. 6(a) and 6(b), in which there was a difference between the depth-directional distances of the left and right sides of an object to be displayed.

When there is a difference between the depth-directional distances of the left and right or upper and lower parts of an object to be displayed, then when the graphics data encoder 23 carries out the encoding process, if it calculates the shift widths of the positions of the upper and lower left and right ends and places the results in the encoded sub-video data, the right-eye image can be rendered with reference to the left-eye image. In the decoding process carried out in the graphics data decoder 43, use of the encoded sub-video data makes it possible to reproduce the object to be displayed as the right-eye image from the left-eye image data and the shift widths of the upper and lower left and right ends.

Figure 11:
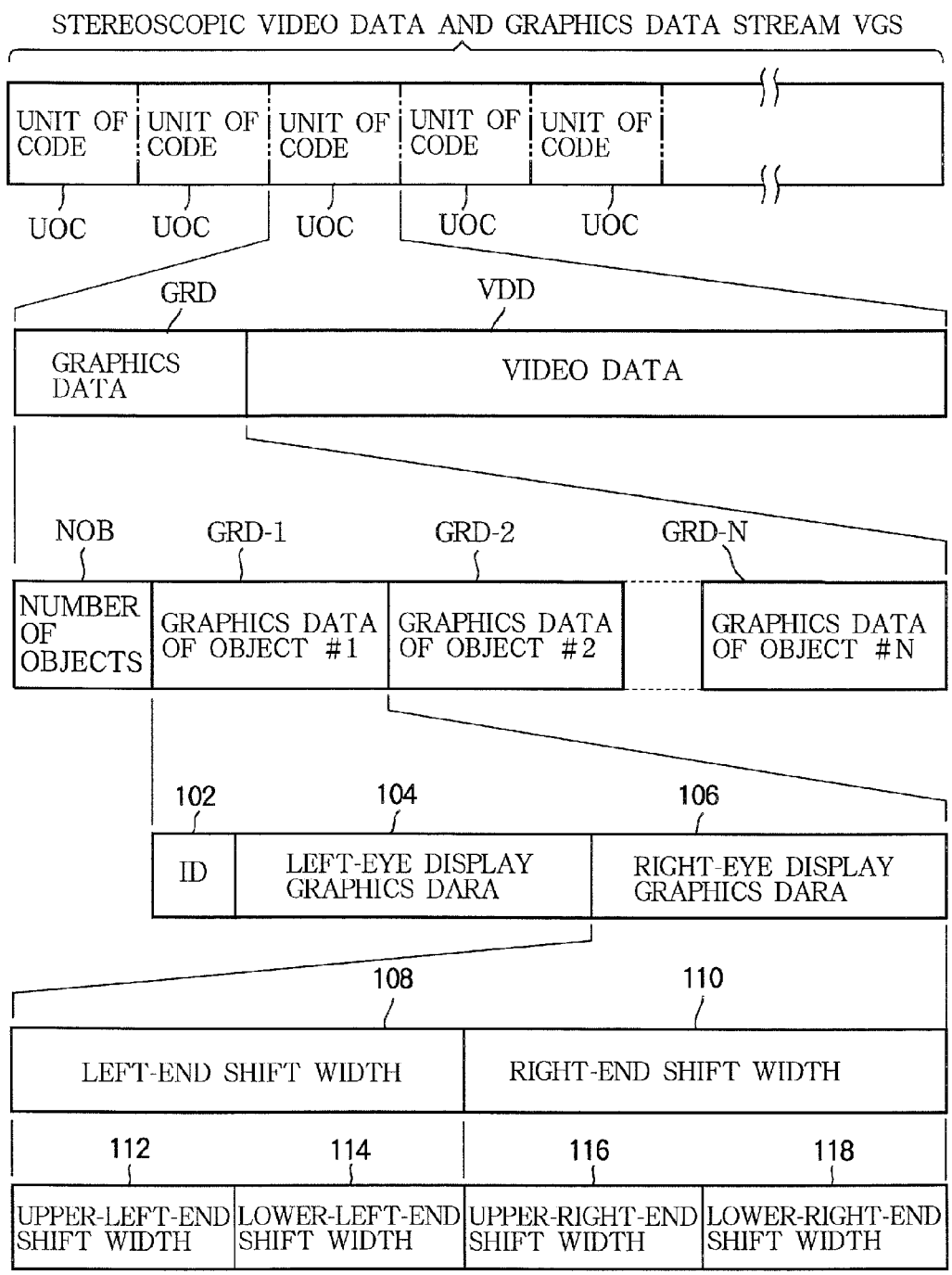
FIG. 11 illustrates the encoded video data structure for the example in FIGS. 9(a) and 9(b).

FIG. 11 illustrates the data structure of the encoded video data in the example shown in the FIGS. 9(a) and 9(b). Most of this drawing is the same as FIG. 8; only the differences will be described.

In FIG. 8, the 'right-eye display graphics data' 106 consists of only the two fields 'left-end shift width' 108 and 'right-end shift width' 110. In FIG. 11, in order to deal with the example in FIGS. 9(a) and 9(b), the 'left end shift width' 108 further comprises two fields, an 'upper-left-end shift width' 112 and a 'lower-left-end shift width' 114; the 'right-end-shift width' 110 further comprises two fields, an 'upper-right-end shift width' 116 and a 'lower-right-end shift width' 118.

All these data are shift width data necessary to reproduce an object to be displayed in the right-eye image from an object to be displayed in the left-eye image in the way described above; in the example in FIGS. 7(a) and 7(b), one value can be identically assigned to the 'upper-left-end shift width' and 'lower-left-end shift width', and another value can be identically assigned to the 'upper-right-end shift width' and 'lower-right-end shift width'.

In the example in FIGS. 10(a) and 10(b), one value can be identically assigned to the 'upper-left-end shift width' and 'upper-right-end shift width', and another value can be identically assigned to the 'lower-left-end shift width' and 'lower-right-end shift width'. In the general case, an appropriate value is calculated and set in the graphics data encoder 23 for each of the four fields according to the inclination of the object.

Third Embodiment

Figure 10:
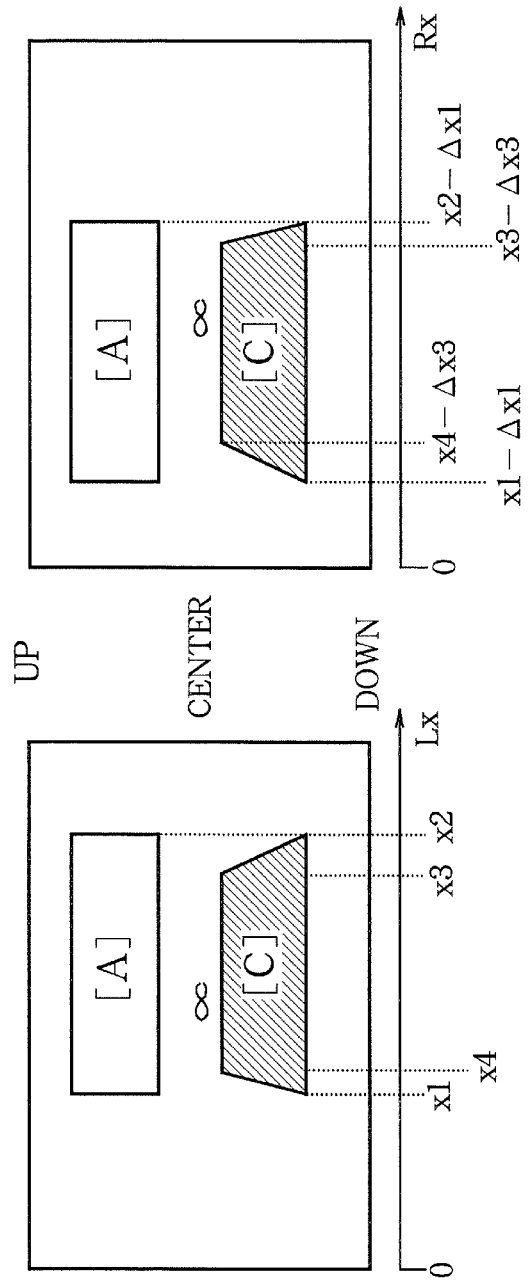
FIGS. 10(a) and 10(b) show the configurations of the images of the subtitle shown in FIGS. 9(a) and 9(b) for the left and right eyes.

FIGS. 12(a) and 12(b) illustrate an exemplary subtitle drawing method used in the third embodiment of the invention. A subtitle drawing method different from the drawing method in FIGS. 10(a) and 10(b) is shown here. FIG. 10 shows how the right-eye image of a vertically inclined subtitle is generated from the left-eye image by using subtitle 'C' as an example. In the example, the left-eye image is trapezoidal, and the x-axis values indicating the horizontal positions of its vertices are x1, x2, x3, and x4. For simplification of the positional representation of the right-eye image with reference to the left-eye image, however, it is simpler to form a rectangular drawing area first, then draw the trapezoidal subtitle 'C' within that area, and deform the entire rectangular drawing area, including the subtitle, for the right-eye image.

As shown in FIG. 12(a), in the image for the left eye L, a trapezoidal subtitle 'C' is drawn in a rectangular drawing area in the range indicated by the dash-dot line located between x-coordinates x1 and x2. The lower side of the rectangle matches to the lower side of subtitle 'C'. When the image for the right eye R is generated from the image for the left eye L, if the rectangular drawing area Qa is shifted and deformed to an appropriate parallelogram Qb as shown in FIG. 12(b), the trapezoidal subtitle 'C' that has been drawn in this area becomes identical to the shape shown in FIG. 10(b).

The lower left and right ends of the rectangular drawing area in the image for the left eye L are horizontally positioned at (x1−Δx1) and (x2−Δx2) in the image for the right eye R. The upper left and right ends are positioned at (x1−Δx11) and (x2−Δx12). In this example, Δx1 equals Δx2, and Δx11 equals Δx12. In generating the right-eye image, the left and right end shift widths of the drawing area are calculated for each horizontal scanning line to determine the drawing position. In this way, if the right-eye image is generated from the left-eye image by defining the rectangular drawing area as one object and specifying the horizontal shift widths of its vertices, the location of the intended object can be represented easily, enabling easy generation of the image.

Another possible drawing method is to multiply the horizontal length factors in each horizontal scanning line included in the rectangular drawing area by a scaling coefficient. The operations required to generate the right-eye image can be simplified by determining how much the width of the rectangular drawing area is scaled at the upper and lower sides of the deformed trapezoidal drawing area, and then proportionately calculating the scaling coefficients depending on height-directional position in the drawing area.

The data structure described above in FIG. 11 is applicable as the structure of the data representing the shift widths of the vertices; in the example in FIG. 12, the 'upper left end shift width' is Δx11, the 'lower left end shift width' is Δx1, the 'upper right end shift width' is Δx12, and the 'lower right end shift width' is Δx2. If the values of these four points are appropriately set, it becomes possible to represent the stereoscopic effect of a plane object located at an arbitrary position in the depth direction.

The crux of the invention is that when an object with four vertices located at different depth-directional positions is displayed, the positions of the four vertices of the right-eye object are calculated from the positions of the four corresponding points at the upper and lower left and right ends of the left-eye object. The above description gave an exemplary data representation in which, in order to simplify the calculation of the positions of the four points at the upper left and right and lower left and right vertices of the right-eye object, fields are provided in which their individual shift widths are set, but the method of representing the four vertex positions is not limited to this 'shift width' method. Another method is to represent the positions at the 'upper left end' and 'lower left end' of the right-eye object by 'shift width' and represent the positions at the 'upper right end' and 'lower right end' by the ratios of the horizontal length of the upper and lower ends of the object. When the length ratio is '1.0', for example, the shift width of the right end of the object is defined as being identical to the shift width of the left end of the object; when the length ratio is greater than '1.0', the length from the left end to the right end of the object is expanded at that ratio; if the length ratio is smaller than '1.0', the length from the left end to the right end of the object is reduced at that ratio. Fields may then be provided in which the horizontal length ratios at the upper ends and the lower ends of the object are set as the positional representation instead of the 'shift width' of the 'upper right end' and 'lower right end'.

The above description stated that the right-eye image can be generated from the left-eye image just by shifting the left-eye image in the horizontal direction. The basis for this will now be confirmed.

FIGS. 13(a) and 13(b) are drawings illustrating the relationship between binocular parallax and height that forms the principal of the invention. Like FIGS. 3(a) and 3(b), which indicate the relationship between binocular parallax and depth, FIGS. 13(a) and 13(b) provide a plan view (a) and a side view (b) of the entire viewspace, but a different object is placed therein. A bar-shaped object E is placed at distance d6 in the depth direction in a general position separated from the central lines of sight of both eyes. The images captured by the left-eye and right-eye cameras at the time of photography are displayed on a screen indicated as a 'display screen' in the drawing, located at distance d0, for example, at the time of reproduction. When viewed from the viewpoint of the viewer, the image taken by the left-eye camera is displayed so as to be visible to the left eye L, and the image taken by the right-eye camera is displayed so as to be visible to the right eye R.

The lines of sight leading to both ends of object E when displayed in this way and viewed from the left eye L and right eye R are respectively indicated in the plan view in FIG. 13(a) and side view in FIG. 13(b). In the left-eye and right-eye images, object E is displayed in a plane in which the lines of sight intersect the display screen positioned at distance d0. It is obvious that in the plan view in FIG. 13(a), the directions of the lines of sight from the left and right eyes to the upper end of the object are offset in the horizontal direction due to binocular parallax, while in the vertical direction, as seen in the side view in FIG. 13(b) these directions match. In other words, it can be seen that object E can be displayed at the same height in both the left-eye and right-eye images.

As described above, the inventive video encoding device and method enable a sub-picture to be configured to include a plurality of modules, and enable the shift widths of the horizontal display positions of the left and right ends of each module displayed in the right-eye image to be set and stored in the sub-picture data.

The inventive video encoding device and method display sub-picture data superimposed as a left-eye sub-picture on the left-eye video image without change, and shift the horizontal display position of the sub-picture data by a given width for the right-eye sub-picture, which is then displayed superimposed on the right-eye video image.

The inventive video recording medium and video data stream internally hold stereoscopic video data including sub-picture data encoded as described above.

Each 'shift width' described above is held as a fixed value in a data stream, but the reproducing device may also alter the 'shift width' it reads from the data stream by an adjustment function added to the reproducing device and vary the depth directional distance at which the corresponding object is displayed. It is then possible to display the object at the distance the user wants.

The above description of the invention described a device and method for encoding and reproducing a sub-video image to be displayed superimposed on a stereoscopic main video image. This invention, however, is also applicable when there is no main video image but only a sub-video image.

That is, the invention is applicable as a general encoding and reproducing device and method that enable graphics to be represented in the depth direction and viewed stereoscopically, reduce the amount of data that must be used, simplify the computational processing required for stereoscopic rendering, and reduce costs by requiring less computational processing power, or improve the refresh rate of a stereoscopic video display with a given computational processing power.

In the case in which only graphics are used as the video image, among the components of the video encoding device shown in FIG. 1, the left-eye camera 11, right-eye camera 12, video encoder 21, and data stream multiplexer 25 are unnecessary. Among the components of the video reproducing device shown in FIG. 2, the video data decoder 41, data stream demultiplexer 45, left-eye video and graphics display synthesis means 51, and right-eye video and graphics display synthesis means 52 are unnecessary.

EXPLANATION OF REFERENCE CHARACTERS 11 left-eye video camera, 12 right-eye video camera, 21 video data encoder, 22 graphics generator, 23 graphics data encoder, 25 data stream multiplexer, 30 data stream transmission and storage means, 31 transmitting and recording means, 32 recording medium, 33 receiving and reproducing means, 41 video data decoder, 43 graphics data decoder, 45 data stream demultiplexer, 51 left-eye video and graphics display synthesis means, 52 right-eye video and graphics display synthesis means, 60 stereoscopic display.

What is claimed is:

1. A video encoding device that generates video data for visualization of a stereoscopic video image by display of separate video images for the left and right eyes, the video encoding device comprising:
   a sub-video encoding unit configured to encode data of monoscopic sub-video display images for first and second viewpoints to be displayed superimposed on main video display images for the first and second viewpoints forming the stereoscopic video image, the sub-video display images for the first and second viewpoints displayed as additional video data of the main video display images, thereby generating an encoded sub-video data stream; wherein
   the sub-video encoding unit encodes the data of one or more objects included in the sub-video display image for the first viewpoint so that the data can be independently decoded and displayed, and
   the sub-video encoding unit dependently encodes the second viewpoint with respect to the first viewpoint by only encoding depth expressions determined by performing at least an expansion or contraction, in a horizontal direction, of one or more objects included in the sub-video display image for the second viewpoint with respect to corresponding objects included in the sub-video display image for the first viewpoint thereby changing the shape of said one or more objects and the perspective view of said second viewpoint.

2. The video encoding device of claim 1, wherein data indicating a shift width at the left end and a shift width at the right end in the horizontal direction on the display surface, for each of the objects, are generated independently as the data of sub-video display image for the second viewpoint.

3. A video reproducing device that decodes data of a stereoscopic video image including a sub-video image encoded by the video encoding device of claim 1, and displays separate video images for the left and right eyes, thereby visualizing the stereoscopic video image, the video reproducing device comprising:
   a sub-video decoding unit configured to decode data of monoscopic sub-video display images for a plurality of viewpoints, the sub-video display images being displayed superimposed on main video display images for the first and second viewpoints forming the stereoscopic video image, the sub-video display images for the plurality of viewpoints being displayed as additional video data for the main video display images; wherein the sub-video decoding unit
   independently decodes the data of one or more objects included in the sub-video display image for the first viewpoint, and
   dependently decodes the data of one or more objects included in the sub-video display image for the second viewpoint by decoding depth expressions and performing at least an expansion or contraction, in the horizontal direction on the display surface, of one or more objects included in the sub-video display image for the second viewpoint with respect to corresponding objects included in the sub-video display image for the first viewpoint, based on the depth expression data of the sub-video display image for the second viewpoint, and displays the result.

4. A non-transitory video recording medium storing data of a sub-video image encoded by the video encoding device of claim 1, being multiplexed with the data of the stereoscopic video image.

5. A video encoding method that generates video data for visualization of a stereoscopic video image by display of separate video images for the left and right eyes, the video encoding method comprising:
   a sub-video encoding step for encoding data of monoscopic sub-video display images for first and second viewpoints to be displayed superimposed on main video display images for the first and second viewpoints forming the stereoscopic video image, the sub-video display images for the first and second viewpoints being displayed as additional video data for the main video display images, thereby generating an encoded sub-video data stream; wherein the sub-video encoding step includes:

a substep of encoding the data of one or more objects included in the sub-video display image for the first viewpoint so that the data can be independently decoded and displayed, and a substep of encoding the data of one or more objects included in the sub-video display image for the second viewpoint so that the data dependently decoded with respect to the first viewpoint and displayed by only encoding depth expressions determined by performing at least an expansion or contraction, in a horizontal direction, of one or more objects included in the sub-video display image for the second viewpoint with respect to corresponding objects included in the sub-video display image for the first viewpoint thereby changing the shape of said one or more objects and the perspective view of said second viewpoint, depth being expressed by these sub-steps.

6. The video encoding method of claim 5, wherein data indicating a shift width at the left end and a shift width at the right end in the horizontal direction on the display surface, for each of the objects, are generated independently as the data of the subvideo display image for the second viewpoint.

7. A video reproducing method that decodes data of a stereoscopic video image including a sub-video image encoded by the video encoding method of claim 5, and displays separate video images for the left and right eyes, thereby visualizing the stereoscopic video image, the video reproducing method comprising:

a sub-video decoding step for decoding data of monoscopic sub-video display images for a plurality of viewpoints, the sub-video display images being displayed superimposed on main video display images for the first and second viewpoints forming the stereoscopic video image, the sub-video display images for the plurality of viewpoints being displayed as additional video data for the main video display images; wherein the sub-video decoding step includes:

a substep of independently decoding the data of one or more objects included in the sub-video display image for the first viewpoint, and a substep of dependently decoding the data of one or more objects included in the sub-video display image for the second viewpoint by decoding depth expressions and performing at least an expansion or contraction, in the horizontal direction on the display surface, of one or more objects included in the sub-video display image for the second viewpoint with respect to corresponding objects included in the sub-video display image for the first viewpoint based on the depth expression data of the sub-video display image for the second viewpoint, and displaying the result.

* * * * *